US011727664B2

(12) United States Patent
Wang et al.

(10) Patent No.: US 11,727,664 B2
(45) Date of Patent: Aug. 15, 2023

(54) SYSTEMS AND METHODS FOR DETERMINING AN ADAPTIVE REGION OF INTEREST (ROI) FOR IMAGE METRICS CALCULATIONS

(71) Applicant: ZEBRA TECHNOLOGIES CORPORATION, Lincolnshire, IL (US)

(72) Inventors: Dayou Wang, Mount Sinai, NY (US); Michelle X. Wang, Mount Sinai, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 268 days.

(21) Appl. No.: 17/241,544

(22) Filed: Apr. 27, 2021

(65) Prior Publication Data

US 2022/0343102 A1    Oct. 27, 2022

(51) Int. Cl.
  *G06V 10/25* (2022.01)
  *G06V 10/141* (2022.01)
  *H04N 23/71* (2023.01)
  *H04N 23/73* (2023.01)

(52) U.S. Cl.
  CPC .......... *G06V 10/25* (2022.01); *G06V 10/141* (2022.01); *H04N 23/71* (2023.01); *H04N 23/73* (2023.01)

(58) Field of Classification Search
  CPC .... G06V 10/25; G06V 10/141; G06V 10/225; G06V 10/56; G06V 10/993; H04N 23/71; H04N 23/73; H04N 23/72; H04N 23/61

USPC ........................................................ 382/181
See application file for complete search history.

(56) References Cited

U.S. PATENT DOCUMENTS

| 5,048,095 A | 9/1991 | Bhanu et al. |
| 5,984,870 A | 11/1999 | Giger et al. |
| 6,442,294 B1 | 8/2002 | Nishizawa et al. |
| 2002/0141631 A1 | 10/2002 | Vaisberg et al. |
| 2005/0213841 A1 | 9/2005 | Linguraru et al. |
| 2006/0126932 A1 | 6/2006 | Eschbach |

(Continued)

OTHER PUBLICATIONS

International Search Report and Written Opinion for International Application No. PCT/US2022/20884 dated Jun. 1, 2022.

*Primary Examiner* — Stephen P Coleman
(74) *Attorney, Agent, or Firm* — Yuri Astvatsaturov (57) ABSTRACT

Systems and methods for adaptively determining a region of interest (ROI) are disclosed herein. An example device includes an imaging assembly and a controller. The imaging assembly captures image data comprising pixel data from a plurality of pixels. The controller calculates a contrast value for each pixel of the plurality of pixels, generates a histogram of contrast values, calculates an area under the curve of the histogram, and determines a contrast value threshold to delineate between high-contrast value pixels and low-contrast value pixels. The controller also identifies a ROI within the image data by locating a region within the image data that (i) satisfies a pre-determined size threshold and (ii) contains a largest number of high-contrast value pixels relative to all other regions that satisfy the pre-determined size threshold, and adjusts imaging parameters of the imaging assembly based on the ROI to capture at least one subsequent image.

20 Claims, 5 Drawing Sheets

(56) References Cited

U.S. PATENT DOCUMENTS

2007/0280556 A1 12/2007 Mullick et al.
2013/0229541 A1* 9/2013 Webb .................. G06T 5/007
                                                      348/222.1

* cited by examiner

SYSTEMS AND METHODS FOR DETERMINING AN ADAPTIVE REGION OF INTEREST (ROI) FOR IMAGE METRICS CALCULATIONS

BACKGROUND

Ever since the introduction of machine vision systems to industrial settings, developers have been attempting to reduce their corresponding cost requirements associated with these systems. Machine vision may generally provide high fidelity image analysis at a cost of capturing images under finely tuned imaging parameters (e.g., exposure length). To establish these imaging parameters, machine vision cameras typically capture multiple images and conduct several rounds of image analysis (e.g., coarse and fine) to evaluate image quality metrics, such as sharpness and brightness, for each captured image. A region of interest (ROI) is normally specified for each captured image to reduce the overall processing requirements of the machine vision system during evaluation of the image quality metrics, and conventional systems assume a relatively large, static location of the ROI within each captured image.

Unfortunately, assuming a large, static ROI location within a captured image has several drawbacks. For example, the static ROI may incorrectly identify or otherwise include and/or exclude areas, imaging planes, and/or other objects included in each captured image that the machine vision system is tasked with imaging with high fidelity. As a result, a conventional machine vision system may adjust the imaging settings of the machine vision camera based on erroneous image quality metrics, and may thereby capture low-quality images (e.g., out-of-focus, dark, low contrast, etc.) of the true object/region of interest. Moreover, when conventional machine vision systems conduct several rounds of image analysis for each image to evaluate image quality metrics, the conventional systems consume a substantial amount of processing resources and time.

Thus, there is a need for systems and methods for determining an adaptive ROI that allow for fast and efficient real-time image quality metrics calculations and imaging setting adjustments for a machine vision system.

SUMMARY

In an embodiment, the present invention is a device for adaptively determining a region of interest (ROI). The device may comprise: an imaging assembly configured to capture images, and a controller communicatively coupled to the imaging assembly. The controller may be configured to: capture, by the imaging assembly, at least one image comprising image data, wherein the image data comprises pixel data from a plurality of pixels, calculate a contrast value for each pixel of the plurality of pixels by determining a difference between a respective brightness value of a respective pixel and brightness values of one or more neighboring pixels relative to the respective pixel, generate a histogram of contrast values based on the at least one image, calculate an area under the curve of the histogram, determine a contrast value threshold to delineate between high-contrast value pixels and low-contrast value pixels based on the area under the curve, identify a ROI within the image data by locating a region within the image data that (i) satisfies a pre-determined size threshold and (ii) contains a largest number of high-contrast value pixels relative to all other regions within the image data that satisfy the pre-determined size threshold, adjust imaging parameters of the imaging assembly based on the ROI, and capture, by the imaging assembly, at least one subsequent image using the adjusted imaging parameters.

In a variation of this embodiment, the controller may be further configured to: determine the contrast value threshold by designating a particular contrast value that represents a delineation between a pre-determined population threshold of contrast values and a remainder of contrast values included in the histogram as the contrast value threshold.

In another variation of this embodiment, the controller may be further configured to: analyze the image data to identify a visual indicia within the image data; and responsive to identifying a visual indicia within the image data, assign the location of the visual indicia as the ROI.

In yet another variation of this embodiment, the controller may be further configured to: determine a brightness metric and a sharpness metric corresponding to pixels included in the ROI; and adjust the imaging parameters of the imaging assembly based on the brightness metric and the sharpness metric.

In still another variation of this embodiment, determining the contrast value for each pixel of the plurality of pixels includes determining a maximum difference between the respective brightness value of the respective pixel and the brightness values of the one or more neighboring pixels relative to the respective pixel.

In yet another variation of this embodiment, the controller is further configured to: identify one or more additional ROIs within the image data by locating one or more respective regions within the image data that (i) each satisfy a pre-determined size threshold and (ii) each contain a threshold number of high-contrast value pixels.

In still another variation of this embodiment, the pre-determined size threshold corresponds to a number of pixels included in the plurality of pixels.

In another embodiment, the present invention is a method for adaptively determining a region of interest (ROI). The method may comprise: capturing, by an imaging assembly, at least one image comprising image data, wherein the image data comprises pixel data from a plurality of pixels; calculating, by one or more processors, a contrast value for each pixel of the plurality of pixels by determining a difference between a respective brightness value of a respective pixel and brightness values of one or more neighboring pixels relative to the respective pixel; generating, by the one or more processors, a histogram of contrast values based on the at least one image; calculating, by the one or more processors, an area under the curve of the histogram; determining, by the one or more processors, a contrast value threshold to delineate between high-contrast value pixels and low-contrast value pixels based on the area under the curve; identifying, by the one or more processors, a ROI within the image data by locating a region within the image data that (i) satisfies a pre-determined size threshold and (ii) contains a largest number of high-contrast value pixels relative to all other regions within the image data that satisfy the pre-determined size threshold; adjusting, by the one or more processors, imaging parameters of the imaging assembly based on the ROI; and capturing, by the imaging assembly, at least one subsequent image using the adjusted imaging parameters.

In a variation of this embodiment, the method further comprises: determining, by the one or more processors, the contrast value threshold by designating a particular contrast value that represents a delineation between a pre-determined population threshold of contrast values and a remainder of contrast values included in the histogram as the contrast value threshold.

In another variation of this embodiment, the method further comprises: analyzing, by the one or more processors, the image data to identify a visual indicia within the image data; and responsive to identifying a visual indicia within the image data, assigning, by the one or more processors, the location of the visual indicia as the ROI.

In yet another variation of this embodiment, the method further comprises: determining, by the one or more processors, a brightness metric and a sharpness metric corresponding to pixels included in the ROI; and adjusting, by the one or more processors, the imaging parameters of the imaging assembly based on the brightness metric and the sharpness metric.

In still another variation of this embodiment, determining the contrast value for each pixel of the plurality of pixels includes determining a maximum difference between the respective brightness value of the respective pixel and the brightness values of the one or more neighboring pixels relative to the respective pixel.

In yet another variation of this embodiment, the method further comprises: identifying, by the one or more processors, one or more additional ROIs within the image data by locating one or more respective regions within the image data that (i) each satisfy a pre-determined size threshold and (ii) each contain a threshold number of high-contrast value pixels.

In still another variation of this embodiment, the pre-determined size threshold corresponds to a number of pixels included in the plurality of pixels.

In yet another embodiment, the present invention is a tangible machine-readable medium comprising instructions that, when executed, cause a machine to at least: capture, via an imaging assembly, at least one image comprising image data, wherein the image data comprises pixel data from a plurality of pixels; calculate a contrast value for each pixel of the plurality of pixels by determining a difference between a respective brightness value of a respective pixel and brightness values of one or more neighboring pixels relative to the respective pixel; generate a histogram of contrast values based on the at least one image; calculate an area under the curve of the histogram; determine a contrast value threshold to delineate between high-contrast value pixels and low-contrast value pixels based on the area under the curve; identify a ROI within the image data by locating a region within the image data that (i) satisfies a pre-determined size threshold and (ii) contains a largest number of high-contrast value pixels relative to all other regions within the image data that satisfy the pre-determined size threshold; adjust imaging parameters of the imaging assembly based on the ROI; and capture, via the imaging assembly, at least one subsequent image based on the adjusted imaging parameters.

In a variation of this embodiment, the instructions, when executed, further cause the machine to at least: determine the contrast value threshold by designating a particular contrast value that represents a delineation between a pre-determined population threshold of contrast values and a remainder of contrast values included in the histogram as the contrast value threshold.

In another variation of this embodiment, the instructions, when executed, further cause the machine to at least: analyze the image data to identify a visual indicia within the image data; and responsive to identifying a visual indicia within the image data, assign the location of the visual indicia as the ROI.

In yet another variation of this embodiment, the instructions, when executed, further cause the machine to at least: determine a brightness metric and a sharpness metric corresponding to pixels included in the ROI; and adjust the imaging parameters of the imaging assembly configured to capture the image data based on the brightness metric and the sharpness metric.

In still another variation of this embodiment, determining the contrast value for each pixel of the plurality of pixels includes determining a maximum difference between the respective brightness value of the respective pixel and the brightness values of the one or more neighboring pixels relative to the respective pixel.

In yet another variation of this embodiment, the instructions, when executed, further cause the machine to at least: identify one or more additional ROIs within the image data by locating one or more respective regions within the image data that (i) each satisfy a pre-determined size threshold and (ii) each contain a threshold number of high-contrast value pixels.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision system owners/operators have conventionally been plagued with being unable to quickly and accurately achieve high fidelity image analysis. Conventional machine vision systems perform multiple, inefficient rounds of image capture, analysis, and metrics evaluations utilizing large, static regions of interest (ROIs). As a result, conventional machine vision systems consume excessive amounts of processing resources and time to determine imaging settings that often yield low-quality images of the actual object/region of interest within the machine vision camera field of view (FOV).

Thus, it is an objective of the present disclosure to eliminate these and other problems with conventional machine vision systems by enabling the determination of a smaller, adaptive ROI that identifies the actual object(s)/region(s) of interest within the machine vision camera FOV in a more accurate and efficient manner than conventional machine vision systems. As described herein, the embodiments of the present disclosure may reduce the need for costly additional image captures, speed up the image quality metrics calculations, and generally ensure that the system maximizes image capture and processing efficiency and accuracy. For example, a method of the present disclosure may include: capturing, by an imaging assembly, at least one image comprising image data, wherein the image data comprises pixel data from a plurality of pixels; calculating, by one or more processors, a contrast value for each pixel of the plurality of pixels by determining a difference between a respective brightness value of a respective pixel and brightness values of one or more neighboring pixels relative to the respective pixel; generating, by the one or more processors, a histogram of contrast values based on the at least one image; calculating, by the one or more processors, an area under the curve of the histogram; determining, by the one or more processors, a contrast value threshold to delineate between high-contrast value pixels and low-contrast value pixels based on the area under the curve; identifying, by the one or more processors, a ROI within the image data by locating a region within the image data that (i) satisfies a pre-determined size threshold and (ii) contains a largest number of high-contrast value pixels relative to all other regions within the image data that satisfy the pre-determined size threshold; adjusting, by the one or more processors, imaging parameters of the imaging assembly based on the ROI; and capturing, by the imaging assembly at least one subsequent image using the adjusted imaging parameters.

Figure 1:
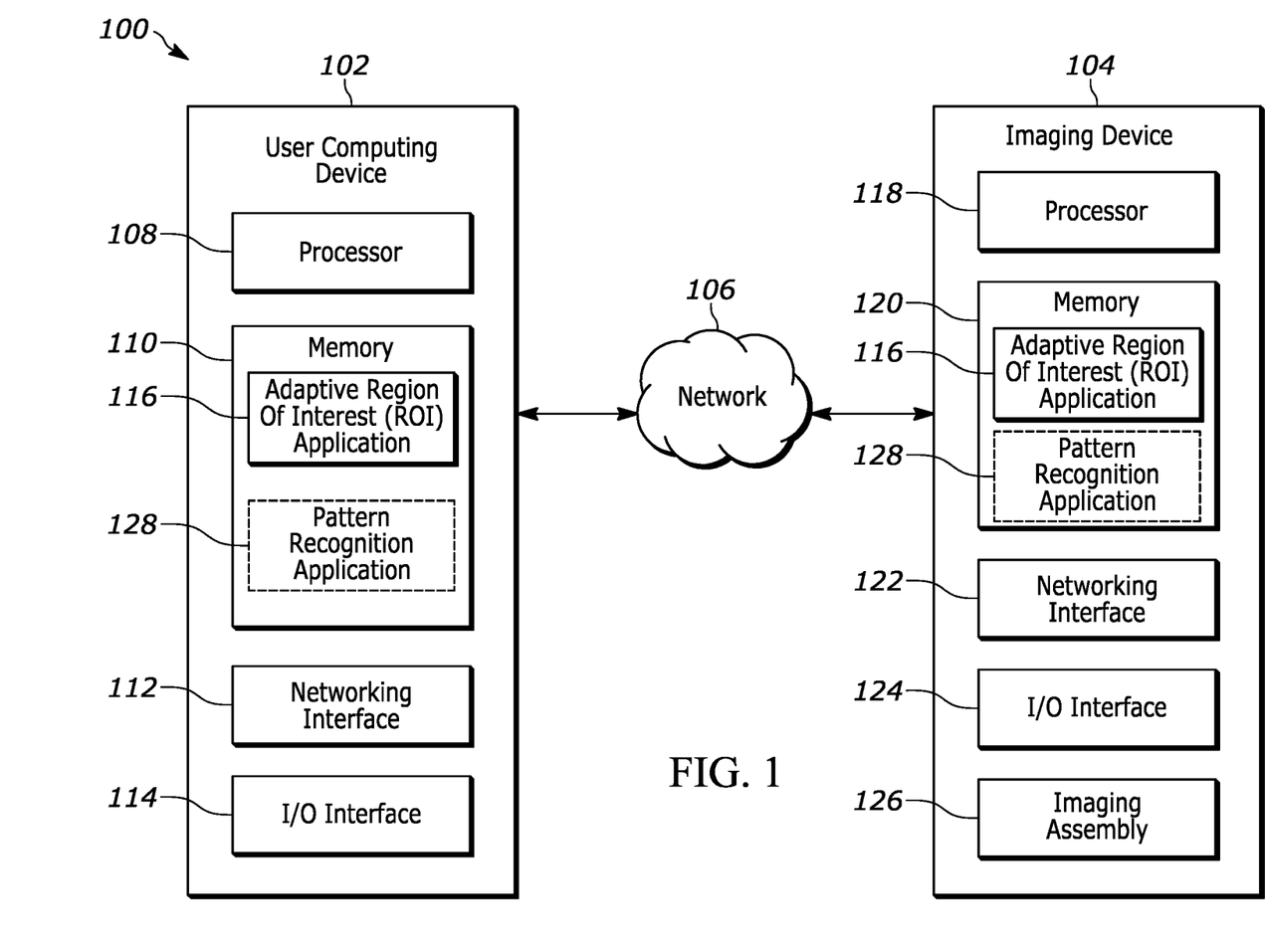
FIG. 1 is an example system for determining an adaptive region of interest (ROI), in accordance with embodiments described herein.

FIG. 1 illustrates an example smart imaging system 100 configured to determine an adaptive ROI, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. Namely, the imaging device 104 may be connected to the user computing device 102 via a network 106, and may generally be configured to interpret and process information received from the user computing device 102.

As an example, the imaging device 104 may obtain a job file containing one or more job scripts from the user computing device 102 across the network 106 that may define the machine vision job and may configure the imaging device 104 to capture and/or analyze images in accordance with the machine vision job. The imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

However, prior to or as part of executing job files, the imaging device 104 may obtain instructions from the user computing device 102 and/or otherwise automatically proceed to perform imaging setting calibration to ensure that the imaging device 104 captures images of sufficient quality for the specified machine vision task(s)/job(s). The imaging setting calibration may include the imaging device 104 executing the adaptive ROI application 116, and the instructions included therein, to determine an adaptive ROI based on captured image data and thereby adjust imaging settings of the imaging assembly 126 to optimize subsequent image captures. Moreover, in certain embodiments, the imaging device 104 may also execute the pattern recognition application 128, and the instructions included therein, in parallel with the execution of the adaptive ROI application 116 to determine the location of a visual indicia within the captured image data and thereby validate the location of the ROI.

In any event, the user computing device 102 is generally configured to enable a user/operator to, for example, create and upload a machine vision job for execution and/or otherwise interact with the imaging device 104. The user/operator may transmit/upload any configuration adjustment, software updates, and/or any other suitable information to the imaging device 104 via the network 106, where the information is then interpreted and processed accordingly. The user computing device 102 may comprise one or more operator workstations, and may include one or more processors 108, one or more memories 110, a networking interface 112, an input/output (I/O) interface 114, an adaptive ROI application 116, and may optionally include a pattern recognition application 128.

The imaging device 104 may include one or more processors 118, one or more memories 120, a networking interface 122, an I/O interface 124, an imaging assembly 126, as well as the adaptive ROI application 116 and, optionally, the pattern recognition application 128. The imaging assembly 126 may include a digital camera and/or digital video camera for capturing or taking digital images and/or frames. Each digital image may comprise pixel data that may be analyzed in accordance with instructions comprising the adaptive ROI application 116 and/or the pattern recognition application 128, as executed by the one or more processors 118, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing, for example, the adaptive ROI application 116 and/or the pattern recognition application 128 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., adaptive ROI application 116, pattern recognition application 128, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the adaptive ROI application 116 and/or the pattern recognition application 128, which may be configured to enable automatic imaging setting calibration/configuration and validation, as described further herein. Additionally, or alternatively, the adaptive ROI application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the adaptive ROI application 116 and/or the pattern recognition application 128, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision imaging setting calibration (e.g., images captured by the imaging device 104 in response to execution of the adaptive ROI application 116) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to initiate imaging setting calibration, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
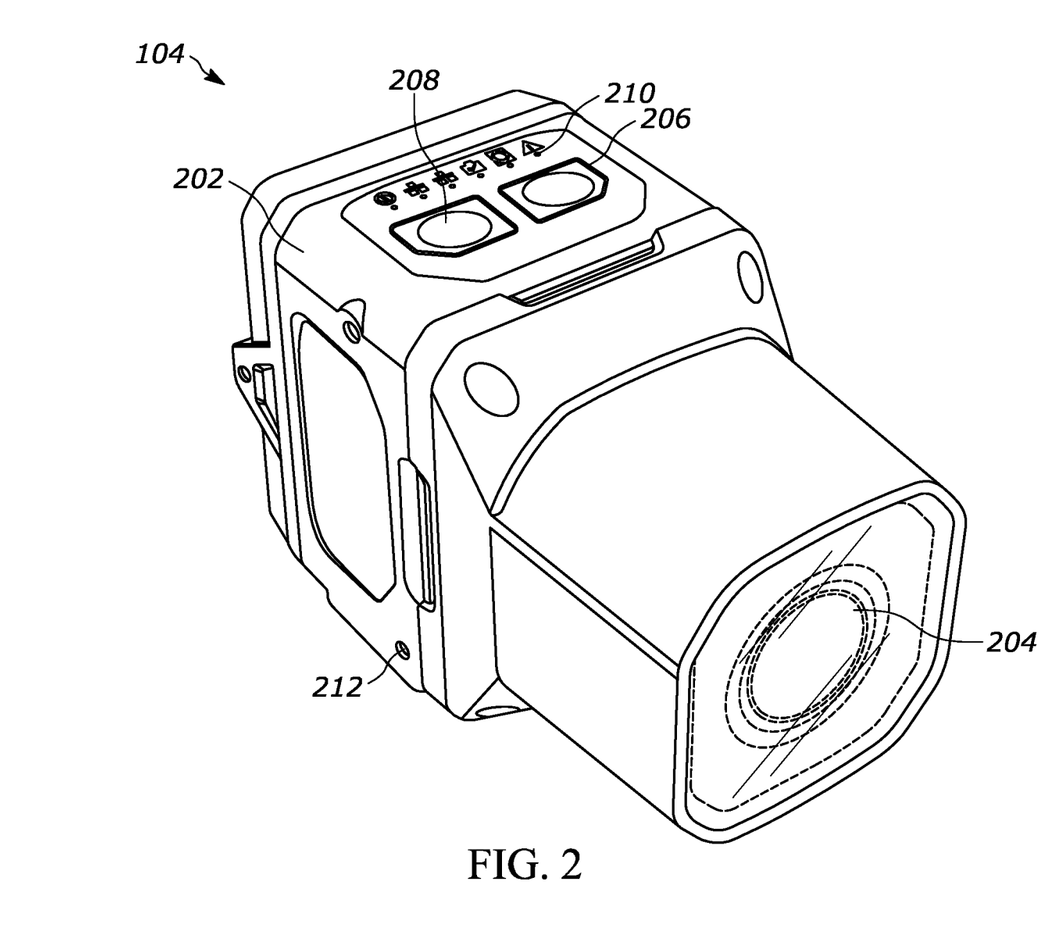
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may automatically and/or in response to instructions received from a user computing device (e.g., user computing device 102) initiate an application (e.g., adaptive ROI application 116) configured to calibrate imaging settings of the imaging device 104 to optimize the image quality of subsequent image captures (e.g., during execution of a machine vision task/job). Of course, the imaging device 104 may independently adjust the imaging settings (e.g., of the imaging assembly 126) in response to the determinations made as part of the execution of the application 116, and/or the imaging device 104 may transmit an indication of these determinations to the user computing device 102 for review/acceptance by a user/operator.

For example, the determinations made as part of the execution of the adaptive ROI application 116 may include instructions to adjust one or more settings related to the imaging aperture 204. Namely, assume that at least a portion of the analysis corresponding to the execution of the adaptive ROI application 116 requires the imaging device 104 to maximize the brightness of the determined adaptive ROI within a captured image. To accommodate this requirement, the imaging device 104 may increase the aperture size of the imaging aperture 204. Thus, the imaging device 104 may be configured to automatically adjust its own configuration to capture images with optimal image characteristics/qualities (e.g., brightness, sharpness), at least in the determined adaptive ROI. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., adaptive ROI application 116). The trigger configuration screen may allow the user to configure one or more triggers for the imaging device 104 that may be stored in memory (e.g., one or more memories 110, 120) for use in machine vision jobs.

As another example, the tuning function of a dome switch/button (e.g., dome/switch button 208) may enable a user to automatically and/or manually adjust the configuration of the imaging device 104 in and/or to display an imaging configuration screen of a user application (e.g., adaptive ROI application 116). The imaging configuration screen may allow the user to configure one or more configurations of the imaging device 104 (e.g., aperture size, exposure length, etc.) that may be stored in memory (e.g., one or more memories 110, 120) for use in machine vision jobs, as discussed herein. Further, and as discussed further herein, a user may utilize the imaging configuration screen (or more generally, the adaptive ROI application 116) to configure specific parameters of a preferred machine vision job/task that enable the imaging device 104 to automatically perform imaging setting calibration in a manner that tailors the imaging settings resulting from execution of the adaptive ROI application 104 to the preferred machine vision job/task. The user may then save the resulting imaging settings as part of a machine vision job that may be subsequently executed by the imaging device 104. The machine vision job may then instruct the imaging device 104 processors (e.g., one or more processors 118) to automatically adjust the imaging settings of the imaging device 104 in accordance with the imaging settings determined as part of the execution of the adaptive ROI application 116.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
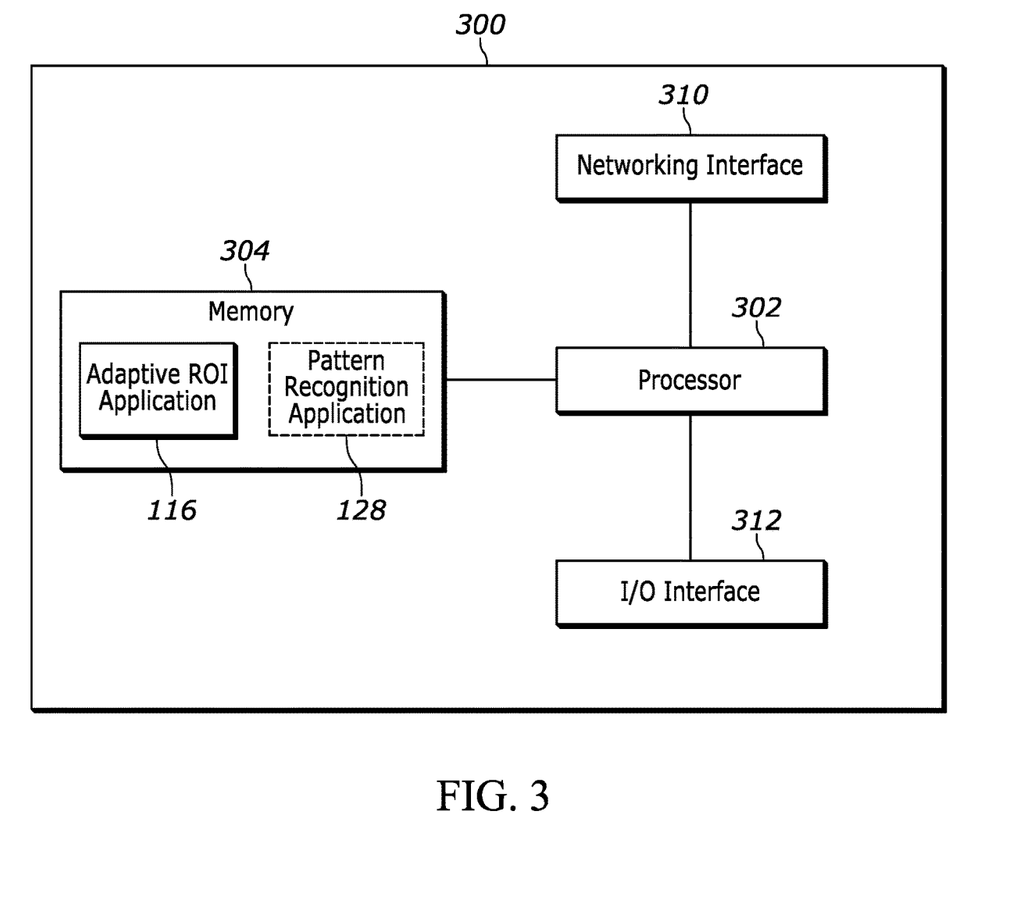
FIG. 3 is a block diagram of an example logic circuit for implementing example methods and/or operations described herein.

FIG. 3 is a block diagram representative of an example logic circuit capable of implementing, for example, one or more components of the example imaging device 104 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The memory 304 also includes the adaptive ROI application 116 and, optionally, the pattern recognition application 128 that are each accessible by the example processor 302. The adaptive ROI application 116 and/or the pattern recognition application 128 may comprise rule-based instructions, an artificial intelligence (AI) and/or machine learning-based model, and/or any other suitable algorithm architecture or combination thereof configured to, for example, determine an adaptive ROI. To illustrate, the example processor 302 may access the memory 304 to execute the adaptive ROI application 116 when the imaging device 104 (via the imaging assembly 126) captures a set of image data comprising pixel data from a plurality of pixels. Additionally, or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 310 to enable communication with other machines via, for example, one or more networks. The example network interface 310 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 312 to enable receipt of user input and communication of output data to the user. Such user input and communication may include, for example, any number of keyboards, mice, USB drives, optical drives, screens, touchscreens, etc.

Figure 4:
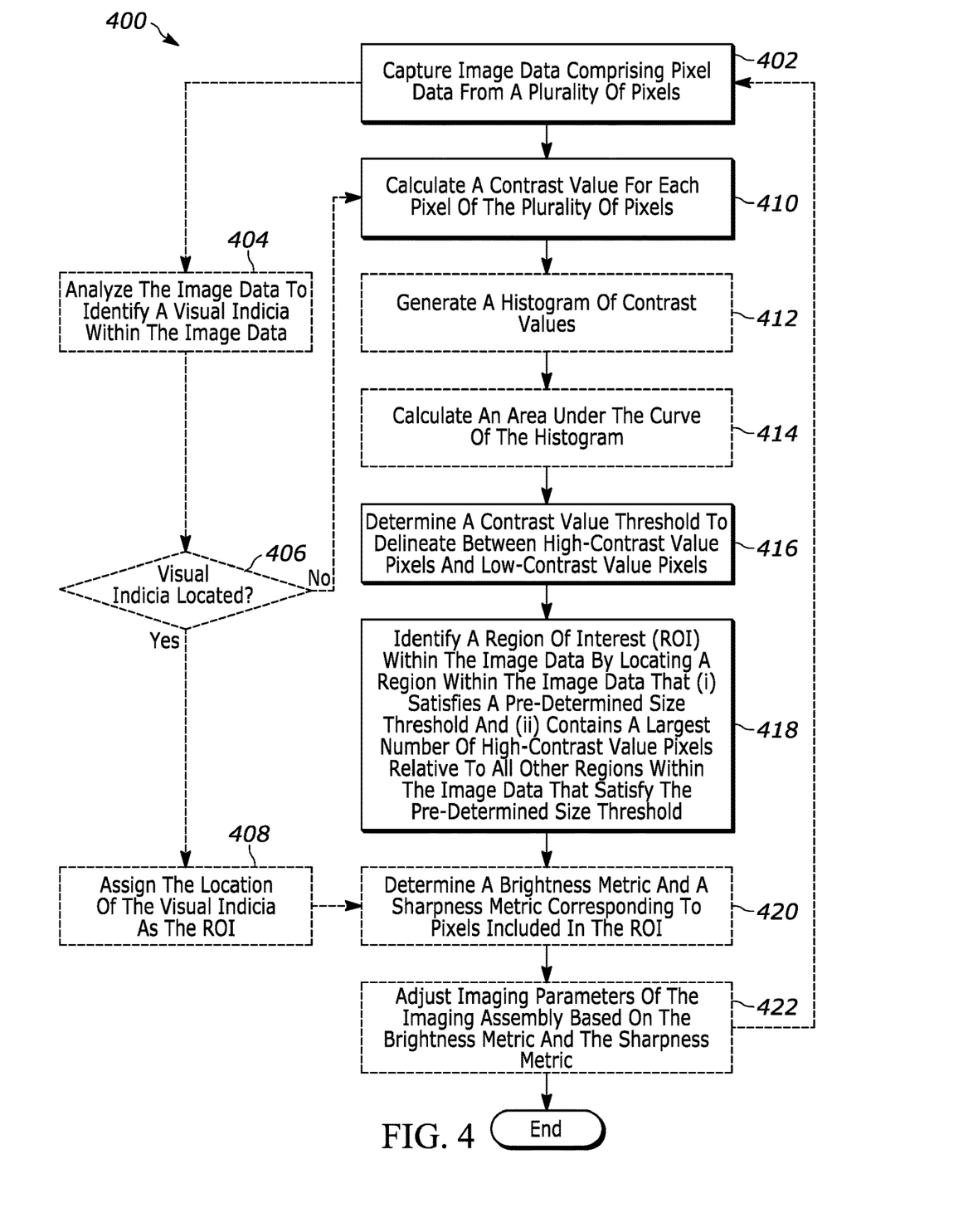
FIG. 4 is a flowchart representative of a method for determining an adaptive ROI, in accordance with embodiments described herein.

FIG. 4 is a flowchart representative of a method 400 for determining an adaptive ROI, in accordance with embodiments described herein. The method 400 describes various methods for determining an adaptive ROI, and embodiments of the method 400 are discussed below in context with reference to FIGS. 5A and 5B. Generally, and as mentioned above, the method 400 for determining an adaptive ROI utilizes captured image data to identify a ROI, upon which the image quality metrics for the captured image should be based. More specifically, the method 400 enables the imaging device (e.g., imaging device 104) and/or another suitable device to determine the ROI based on a pre-determined size threshold and a contrast value threshold. It is to be appreciated that any suitable coordinate system and/or any other measurement metric or combinations thereof may be used to represent the locations associated with images and/or features identified within the images/image data (e.g., location of the ROI, a visual indicia, etc.). Further, it is to be understood that any of the steps of the method 400 may be performed by, for example, the imaging device 104, the adaptive ROI application 116, the pattern recognition application 128, the processor 302, and/or any other suitable components or combinations thereof discussed herein.

In various embodiments, the adaptive ROI application 116 and/or the pattern recognition application 128 may be and/or include a machine learning model (e.g., an adaptive ROI algorithm/model, as described herein). Thus, some or all of the steps of the method 400 may be performed by the machine learning model. For example, the processing platform 300 may include the machine learning model in memory 304. The machine learning model may include, for example, a convolutional neural network and/or any other suitable machine learning technique. The processing platform 300 may train the machine learning model using (i) a plurality of sets of training image data, (ii) a plurality of contrast value thresholds, and (iii) a plurality of sets of training ROI data.

Generally, the machine learning model training may generally take place in two steps. First, the machine learning model may analyze each set of training image data of the plurality of sets of training image data in an attempt to determine the corresponding contrast value thresholds for each set of training image data. The machine learning model may calculate a contrast value for each pixel included in each set of training image data, and may also determine a contrast value threshold for each set of training image data based on a pre-determined delineation of high-contrast value pixels from low-contrast value pixels, as described herein. Based on how closely the determined contrast value thresholds match the known contrast value thresholds for each respective set of training image data, the model may be adjusted to more accurately determine contrast value thresholds in future iterations.

Second, the machine learning model may analyze the contrast value threshold for each respective set of image data in an attempt to determine the ROIs corresponding to each respective set of training image data. The machine learning model may identify the ROI for each set of training image data by locating a region within the training image data that satisfies a pre-determined size threshold and that contains a largest number of high-contrast value pixels relative to all other regions within the set of training image data that satisfy the pre-determined size threshold. Based on how closely the identified ROI for each respective set of training image data matches the known ROI for each respective set of training image data, the model may be adjusted to more accurately identify ROIs in future iterations. In this manner, the processing platform 300 may train and apply the machine learning model to automatically calculate contrast values, determine contrast value thresholds, identify ROIs, and/or perform all/some of the actions described herein with respect to the method 400 for captured image data, thereby increasing the overall system efficiency by reducing the processing bandwidth necessary to perform image metrics calculations/adjustments.

At block 402, the method 400 includes capturing image data comprising pixel data from a plurality of pixels. For example, assume that an imaging device (e.g., imaging device 104) captures an image of a target object as part of an industrial assembly line. In this example, the captured image may include a plurality of pixels that each include pixel data that is representative of either the target object or the environment surrounding the target object. Namely, the pixel data for each pixel of the captured image may include color values (e.g., RGB color values, greyscale color values, etc.) and brightness values (e.g., luminance values) representative of the objects/environment present within the imaging device FOV while the imaging device captured the image.

In various embodiments, the imaging device (e.g., imaging device 104) may execute a pattern recognition application (e.g., pattern recognition application 128) to analyze the captured image data. The pattern recognition application may include instructions (e.g., embodied in a pattern recognition algorithm) that cause the imaging device to identify patterns and/or other indicia included within the image data. Generally, the visual indicia may include any suitable pattern, symbol, alphanumeric character, and/or any other suitable indicia, such as a barcode, a quick read (QR) code, etc. Additionally, or alternatively, the imaging device may simultaneously execute (e.g., in parallel) the pattern recognition application 128 and the adaptive ROI application 116 to analyze the image data according to the instructions included in both applications 116, 118. For example, at optional block 404, the imaging device may execute the pattern recognition algorithm included as part of the pattern recognition application to analyze the captured image 550 of FIG. 5B and identify a visual indicia (e.g., the visual indicia 554) within the captured image 550.

In these embodiments, at optional block 406, the imaging device may determine whether or not a visual indicia is included as part of the image data. In the event that the imaging device identifies a visual indicia within the image data by executing the pattern recognition algorithm (YES branch of optional block 406), the imaging device may assign the location of the visual indicia as the ROI within the image data (optional block 408). Moreover, if the imaging device successfully identifies the visual indicia within the captured image data, the imaging device may proceed to optional block 420 to determine a brightness metric and a sharpness metric corresponding to pixels included in the ROI that is defined by the location of the visual indicia.

Generally, visual indicia included within the image data may be the object/feature of interest, such that when a visual indicia is successfully located within the image data, the imaging device may automatically assign the ROI to encompass the identified visual indicia. For example, in reference to FIG. 5B, assume that the imaging device simultaneously executes the adaptive ROI algorithm and the pattern recognition algorithm. The imaging device may identify the ROI 556 as a result of executing the adaptive ROI algorithm, and may further identify the visual indicia 554 as a result of executing the pattern recognition algorithm. Accordingly, the imaging device may adjust the size and location of the ROI 556 based upon a bounding box that encloses the visual indicia 554. If the bounding box of the visual indicia 554 does not satisfy a pre-determined size threshold, as discussed herein, the imaging device may further adjust the boundaries of the ROI 556 to enclose the visual indicia 554 and a portion of the area surrounding the visual indicia 554 to satisfy the pre-determined size threshold. However, if the imaging device does not identify a visual indicia within the image data by executing the pattern recognition algorithm (NO branch of optional block 406), the imaging device may not adjust the position of an identified ROI (e.g., ROI 556 in FIG. 5B), as described herein.

In any event, at block 410, the method 400 includes calculating a contrast value for each pixel of the plurality of pixels. Generally, pixel contrast values may describe a difference in luminance or color that causes a particular pixel (or on a larger scale, an imaged object) to be distinguishable from neighboring pixels. The imaging device (e.g., imaging device 104) may determine a contrast value for each pixel by determining a difference between a respective brightness value of a respective pixel and brightness values of one or more neighboring pixels relative to the respective pixel. In various embodiments where the captured image is a color image (e.g., RGB color), the imaging device may additionally or alternatively determine a contrast value for each pixel based upon a difference between a respective color value of a respective pixel and color values of one or more neighboring pixels relative to the respective pixel.

When considering "neighboring" pixels (and other location-based features identified within image data), it is important to establish a coordinate system for an image (e.g., the captured image at block 402). For example, assume that a captured image represents the FOV of the imaging device (e.g., imaging device 104) that captured the image, and further assume that the captured image may be overlaid with a coordinate mapping (e.g., a Cartesian coordinate mapping). The coordinate mapping may include a series of 100 equally spaced divisions in a lateral and a vertical direction that divide the captured image into a set of 10,000 equal area regions. Moreover, each of the 100 equally spaced divisions may include a numerical identifier, and the numerical identifiers may monotonically increase as the divisions extend further away in the respective directions. Thus, the coordinate mapping may designate the bottom left corner of the captured image as the origin (e.g., coordinates (0,0)), the top left corner of the captured image having coordinates (0, 100), the bottom right corner of the captured image having coordinates (100,0), and the top right corner of the captured image having coordinates (100,100). Of course, it is to be appreciated that the coordinate mapping may feature/include any suitable coordinate system (e.g., polar coordinates) and/or combinations thereof, and may include any suitable number of divisions defining the coordinates of the image (e.g., based upon the number of pixels included in the plurality of pixels comprising the captured image).

Continuing the prior example, assume that, in various embodiments, the imaging device (e.g., imaging device 104) captures the image using a three dimensional (3D) depth imaging device (e.g., a time of flight (ToF) camera), such that the captured image is a 3D depth image including image data representing objects/environment present within the 3D depth imaging device FOV. In these embodiments, the 3D depth image may also be overlaid with the coordinate mapping, as described with respect to the captured image in the prior example. The 3D depth image may also include a depth component, such that the coordinates describing any particular point (e.g., pixel) in the 3D depth image may have a lateral component, a vertical component, and a depth component. Thus, the coordinate mapping of any particular pixel in the 3D depth image may be represented as (x, y, z), where x is the lateral component, y is the vertical component, and z is the depth component. The depth component for each pixel included in the 3D depth image may describe, for example, a distance of an object represented by the pixel from the 3D depth imaging device (e.g., a ToF camera included as part of the imaging assembly 126). The depth component corresponding to a pixel may be represented in feet, inches, meters, and/or any other suitable units, or combinations thereof.

In any event, one or more processors (e.g., processor 118) of the imaging device may execute an adaptive ROI algorithm that is stored and/or otherwise included as part of an adaptive ROI application (e.g., adaptive ROI application 116) to calculate the contrast value for each pixel of the plurality of pixels. The one or more processors, executing the adaptive ROI algorithm, may compare the brightness value of a particular pixel to the respective brightness values of each of the horizontal and vertical neighboring pixels. Of course, the adaptive ROI algorithm may include instructions to compare the brightness value of the particular pixel to the respective brightness values of any suitable number of pixels and/or pixels of any suitable location relative to the particular pixel. In any event, the imaging device may compare brightness values for respective pixels to calculate a contrast value for a particular pixel in accordance with the following:

$$C_{(x,y)} = |V_{(x,y)} - V_{(x+n,y)}| + |V_{(x,y)} - V_{(x,y+n)}| \quad (1),$$

where $C_{(x,y)}$ is a contrast value of a pixel at location (x,y) within the captured image, $V_{(x,y)}$ is a brightness value of a pixel at location (x,y) within the captured image, and n is a value no less than 1. In various embodiments, calculating the contrast value for each pixel of the plurality of pixels includes determining a maximum difference between the respective brightness value of the respective pixel and the brightness values of the one or more neighboring pixels relative to the respective pixel.

Figure 5A:
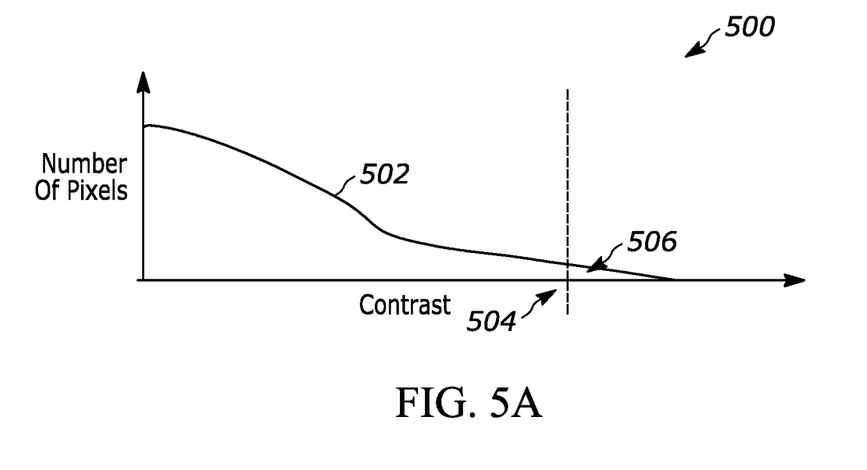
FIG. 5A is an example histogram that may be generated to determine an adaptive ROI, in accordance with embodiments described herein.

At optional block 412, the method 400 may include generating a histogram of contrast values calculated at block 410. The imaging device (e.g., imaging device 104) may generate the histogram by executing the adaptive ROI algorithm (as included as part of the adaptive ROI application 116) which, in turn, may cause the one or more processors (e.g., processor 118) of the imaging device to plot the contrast values of each pixel included in the plurality of pixels (e.g., for the entire captured image), as illustrated in FIG. 5A. Namely, the example histogram 500 of FIG. 5A represents a distribution of contrast values for a plurality of pixels that collectively comprise a captured image. The plotted line 502 may represent, for example, a number of pixels (y-axis) represented by a particular contrast value (x-axis). Of course, the plotted line 502 may represent any suitable combination/ratio of pixel number to pixel contrast value. In any event, at optional block 414, the method 400 may include the one or more processors executing the adaptive ROI algorithm to calculate an area under the curve of the histogram 500.

At block 416, the method 400 may include determining a contrast value threshold to delineate between high-contrast value pixels and low-contrast value pixels. Generally, the contrast value threshold may be any suitable value that separates a first set of pixels (e.g., low-contrast value pixels) from a second set of pixels (e.g., high-contrast value pixels) within the data represented by the histogram (e.g., histogram 500). In various embodiments, one or more processors of the imaging device (e.g., imaging device 104) may execute the adaptive ROI algorithm to determine the contrast value threshold by designating a particular contrast value that represents a delineation between a pre-determined population threshold of contrast values and a remainder of contrast values included in the histogram as the contrast value threshold. For example, the adaptive ROI algorithm may include instructions that cause the imaging device to determine the contrast value threshold by designating a first contrast value that represents a delineation between a bottom 98% of the contrast values and a top 2% of the contrast values as the contrast value threshold. Continuing this example, and again referencing FIG. 5A, the imaging device may designate the first contrast value 504 as the contrast value threshold, such that an area under the curve 506 represents the top 2% of all contrast values present in the captured image.

At block 418, the method 400 may include identifying a ROI within the image data. Generally, the ROI may represent a particular object and/or otherwise a portion of the captured image that features a high concentration of high-contrast value pixels. The imaging device (e.g., imaging device 104) may locate the ROI by analyzing the image data based on a pre-determined size threshold, which may correspond to a number of pixels included in the plurality of pixels (e.g., the entire captured image). For example, the imaging device, executing the adaptive ROI algorithm, may analyze one or more portions of the image data that each comprise one quarter of the image data (e.g., one quarter of the total number of pixels included within the image data). In this example, the imaging device may analyze all/some portions of the captured image data that satisfy the pre-determined size threshold, and may track the number of high-contrast value pixels included in each portion. The imaging device may then determine the image data portion that both satisfies the pre-determined size threshold and that includes the most high-contrast value pixels to identify the ROI.

Figure 5B:
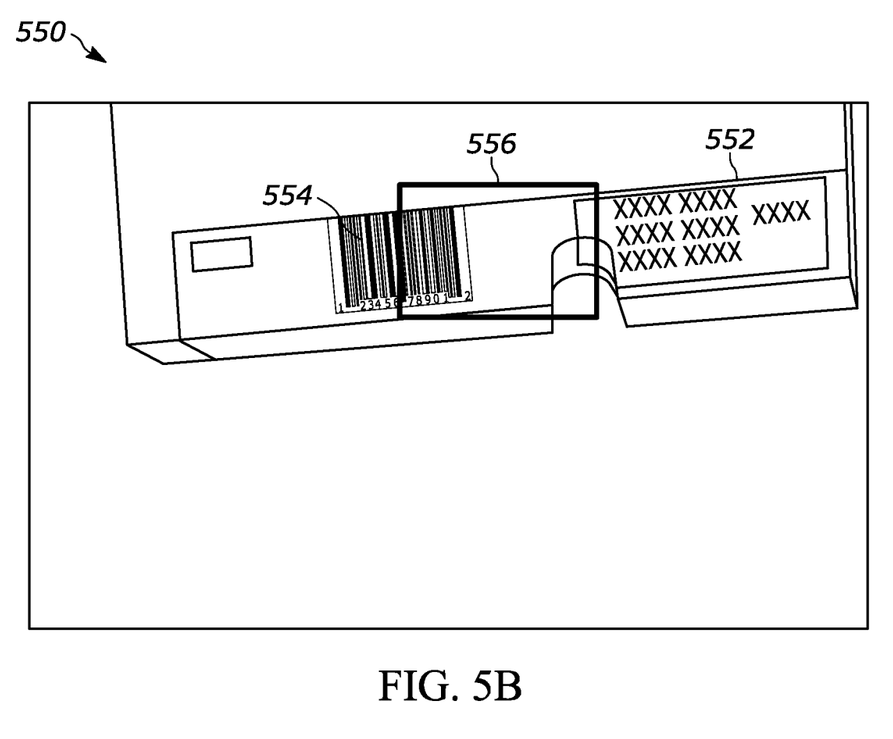
FIG. 5B illustrates an example image capture and determined ROI, in accordance with embodiments described herein.

To illustrate, and in reference to FIG. 5B, the imaging device may analyze the image data of the captured image 550 to identify a ROI within the image data. The captured image 550 may include a target object 552, which may also include a visual indicia 554 (e.g., a barcode). The imaging device may analyze the captured image data of the captured image 550 by analyzing portions of the captured image based on a pre-determined size threshold. As illustrated in FIG. 5B, the pre-determined size threshold may be one quarter the length of the captured image 550 and one quarter the height of the captured image 550, yielding in a pre-determined size threshold of one sixteenth of the total size of the captured image 550 (e.g., one sixteenth of the total number of pixels included within the captured image 550). The imaging device may analyze all/some combinations of pixels within the captured image 550 that satisfy the one-sixteenth size threshold, and may determine a number of high-contrast value pixels for each individual combination of pixels. As a result, the imaging device may identify the ROI 556 because the ROI 556 includes the most high-contrast value pixels of any other combination of pixels that satisfy the one-sixteenth size threshold.

In various embodiments, the imaging device may identify one or more additional ROIs within the image data. Generally, the imaging device may locate one or more respective regions within the image data that (i) each satisfy a pre-determined size threshold and (ii) each contain a threshold number of high-contrast value pixels, and therefore may satisfy the requirements for identification as a ROI within the image data. For example, the imaging device may execute the adaptive ROI algorithm on captured image data, and as a result, may identify three distinct regions within the image data that each satisfy the pre-determined size threshold and that contain the threshold number of high-contrast value pixels. Each of these three distinct regions of the image data may include features of the same/different object(s) represented in the image data. Moreover, the imaging device may execute instructions included as part of the adaptive ROI application that cause the imaging device to specifically identify two, three, etc. ROIs within captured image data due to known features included as part of each captured image. For example, assume that the imaging device is part of an industrial machine vision setup, and is configured to capture image data of four objects placed at a uniform distance from the imaging device. In this example, the adaptive ROI application may include instructions causing the imaging device to execute the adaptive ROI algorithm until four ROIs are identified.

As another example, assume that the that the imaging device is part of an industrial machine vision setup, and is configured to capture image data of three objects each placed at a different distance from the imaging device and staggered within the imaging device FOV such that all three objects are visible within the captured image. In this example, the adaptive ROI application may include instructions causing the imaging device to execute the adaptive ROI algorithm and segment the image into three distinct sections to identify a ROI within each distinct section. Namely, the imaging device may segment the image data into three distinct sections based upon the known locations of the three objects within the imaging device FOV, and may subsequently identify ROIs within each section by executing the adaptive ROI algorithm. In this example, the imaging device may identify ROIs within each distinct section of the image data according to a pre-determined size threshold and/or a threshold number of high-contrast value pixels that is specifically tailored for each distinct section of the image data. For example, a first object featured in a first distinct section of the image data that is displaced further from the imaging device than a second object featured in a second distinct section of the image data may appear out-of-focus and smaller relative to the second object. Thus, the number of high-contrast value pixels representing the first object may not be substantially similar to the number of high-contrast value pixels representing the second object, so the threshold number of high-contrast value pixels and the pre-determined size threshold corresponding to the first and second distinct sections may be different to account for these variations.

In any event, at optional block 420, the method 400 may include determining a brightness metric and a sharpness metric corresponding to pixels included in the ROI. For example, the imaging device may analyze the pixel values of pixels included in the ROI to determine brightness values and sharpness values for each pixel, and may compare these determined brightness and sharpness values to pre-determined brightness and sharpness thresholds. If the imaging device determines that one or both of the brightness value for some/all of the pixels included in the ROI and the sharpness value for some/all of the pixels included in the ROI fail to satisfy the corresponding brightness and sharpness threshold, then the imaging device may further determine that an imaging parameter of the imaging device (e.g., the imaging assembly 126) should be adjusted to optimize the brightness and sharpness values of the pixels included in the ROI.

Accordingly, at optional block 422, the imaging device may adjust imaging parameters of the imaging assembly based on the brightness metric and the sharpness metric. The imaging parameters may generally be any suitable parameter that influences the image capture of the imaging assembly, such as exposure length, focal length, etc. The imaging device may adjust the imaging parameters, in accordance with the instructions of the adaptive ROI algorithm, to thereby capture a subsequent image that ideally includes pixels within the ROI that have increased/optimized brightness and sharpness values. Accordingly, the imaging device (e.g., imaging device 104) may proceed to capture subsequent image data following the adjustment of the imaging parameters (e.g., optionally return to block 402) and further perform the actions of the example method 400 any suitable number of times or in any suitable order in order to achieve optimal image quality (e.g., brightness and sharpness). In this manner, the imaging device may iteratively adjust the imaging parameters of the imaging assembly until the imaging assembly captures high quality images of the objects/environments in the ROI.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device for adaptively determining a region of interest (ROI), the device comprising:
an imaging assembly configured to capture images; and
a controller communicatively coupled to the imaging assembly and configured to:
capture, by the imaging assembly, at least one image comprising image data, wherein the image data comprises pixel data from a plurality of pixels,
calculate a contrast value for each pixel of the plurality of pixels by determining a difference between a respective brightness value of a respective pixel and brightness values of one or more neighboring pixels relative to the respective pixel,
generate a histogram of contrast values based on the at least one image,
calculate an area under the curve of the histogram,
determine a contrast value threshold to delineate between high-contrast value pixels and low-contrast value pixels based on the area under the curve,
identify a ROI within the image data by locating a region within the image data that (i) satisfies a pre-determined size threshold and (ii) contains a largest number of high-contrast value pixels relative to all other regions within the image data that satisfy the pre-determined size threshold,
adjust imaging parameters of the imaging assembly based on the ROI, and
capture, by the imaging assembly, at least one subsequent image using the adjusted imaging parameters.

2. The imaging device of claim 1, wherein the controller is further configured to:
determine the contrast value threshold by designating a particular contrast value that represents a delineation between a pre-determined population threshold of contrast values and a remainder of contrast values included in the histogram as the contrast value threshold.

3. The imaging device of claim 1, wherein the controller is further configured to:
analyze the image data to identify a visual indicia within the image data; and
responsive to identifying a visual indicia within the image data, assign the location of the visual indicia as the ROI.

4. The imaging device of claim 1, wherein the controller is further configured to:
determine a brightness metric and a sharpness metric corresponding to pixels included in the ROI; and
adjust the imaging parameters of the imaging assembly based on the brightness metric and the sharpness metric.

5. The imaging device of claim 1, wherein determining the contrast value for each pixel of the plurality of pixels includes determining a maximum difference between the respective brightness value of the respective pixel and the brightness values of the one or more neighboring pixels relative to the respective pixel.

6. The imaging device of claim 1, wherein the controller is further configured to:
identify one or more additional ROIs within the image data by locating one or more respective regions within the image data that (i) each satisfy a pre-determined size threshold and (ii) each contain a threshold number of high-contrast value pixels.

7. The imaging device of claim 1, wherein the pre-determined size threshold corresponds to a number of pixels included in the plurality of pixels.

8. A method for adaptively determining a region of interest (ROI), the method comprising:
capturing, by an imaging assembly, at least one image comprising image data, wherein the image data comprises pixel data from a plurality of pixels;
calculating, by one or more processors, a contrast value for each pixel of the plurality of pixels by determining a difference between a respective brightness value of a respective pixel and brightness values of one or more neighboring pixels relative to the respective pixel;
generating, by the one or more processors, a histogram of contrast values based on the at least one image;
calculating, by the one or more processors, an area under the curve of the histogram;
determining, by the one or more processors, a contrast value threshold to delineate between high-contrast value pixels and low-contrast value pixels based on the area under the curve;
identifying, by the one or more processors, a ROI within the image data by locating a region within the image data that (i) satisfies a pre-determined size threshold and (ii) contains a largest number of high-contrast value pixels relative to all other regions within the image data that satisfy the pre-determined size threshold;
adjusting, by the one or more processors, imaging parameters of the imaging assembly based on the ROI; and
capturing, by the imaging assembly, at least one subsequent image using the adjusted imaging parameters.

9. The method of claim 8, further comprising:
determining, by the one or more processors, the contrast value threshold by designating a particular contrast value that represents a delineation between a pre-determined population threshold of contrast values and a remainder of contrast values included in the histogram as the contrast value threshold.

10. The method of claim 8, further comprising:
analyzing, by the one or more processors, the image data to identify a visual indicia within the image data; and
responsive to identifying a visual indicia within the image data, assigning, by the one or more processors, the location of the visual indicia as the ROI.

11. The method of claim 8, further comprising:
determining, by the one or more processors, a brightness metric and a sharpness metric corresponding to pixels included in the ROI; and
adjusting, by the one or more processors, the imaging parameters of the imaging assembly based on the brightness metric and the sharpness metric.

12. The method of claim 8, wherein determining the contrast value for each pixel of the plurality of pixels includes determining a maximum difference between the respective brightness value of the respective pixel and the brightness values of the one or more neighboring pixels relative to the respective pixel.

13. The method of claim 8, further comprising:
identifying, by the one or more processors, one or more additional ROIs within the image data by locating one or more respective regions within the image data that (i) each satisfy a pre-determined size threshold and (ii) each contain a threshold number of high-contrast value pixels.

14. The method of claim 8, wherein the pre-determined size threshold corresponds to a number of pixels included in the plurality of pixels.

15. A tangible machine-readable medium comprising instructions that, when executed, cause a machine to at least:
- capture, via an imaging assembly, at least one image comprising image data, wherein the image data comprises pixel data from a plurality of pixels;
- calculate a contrast value for each pixel of the plurality of pixels by determining a difference between a respective brightness value of a respective pixel and brightness values of one or more neighboring pixels relative to the respective pixel;
- generate a histogram of contrast values based on the at least one image;
- calculate an area under the curve of the histogram;
- determine a contrast value threshold to delineate between high-contrast value pixels and low-contrast value pixels based on the area under the curve;
- identify a ROI within the image data by locating a region within the image data that (i) satisfies a pre-determined size threshold and (ii) contains a largest number of high-contrast value pixels relative to all other regions within the image data that satisfy the pre-determined size threshold;
- adjust imaging parameters of the imaging assembly based on the ROI; and
- capture, via the imaging assembly, at least one subsequent image based on the adjusted imaging parameters.

16. The tangible machine-readable medium of claim 15, wherein the instructions, when executed, further cause the machine to at least:
- determine the contrast value threshold by designating a particular contrast value that represents a delineation between a pre-determined population threshold of contrast values and a remainder of contrast values included in the histogram as the contrast value threshold.

17. The tangible machine-readable medium of claim 15, wherein the instructions, when executed, further cause the machine to at least:
- analyze the image data to identify a visual indicia within the image data; and
- responsive to identifying a visual indicia within the image data, assigning the location of the visual indicia as the ROI.

18. The tangible machine-readable medium of claim 15, wherein the instructions, when executed, further cause the machine to at least:
- determine a brightness metric and a sharpness metric corresponding to pixels included in the ROI; and
- adjust the imaging parameters of the imaging assembly configured to capture the image data based on the brightness metric and the sharpness metric.

19. The tangible machine-readable medium of claim 15, wherein determining the contrast value for each pixel of the plurality of pixels includes determining a maximum difference between the respective brightness value of the respective pixel and the brightness values of the one or more neighboring pixels relative to the respective pixel.

20. The tangible machine-readable medium of claim 15, wherein the instructions, when executed, further cause the machine to at least:
- identify one or more additional ROIs within the image data by locating one or more respective regions within the image data that (i) each satisfy a pre-determined size threshold and (ii) each contain a threshold number of high-contrast value pixels.

* * * * *